Patented Nov. 17, 1936

2,061,531

UNITED STATES PATENT OFFICE 2,061,531

ANTIOXIDANT FOR RUBBER

William D. Wolfe, Cuyahoga Falls, Ohio, assignor to Wingfoot Corporation, Wilmington, Del., a corporation of Delaware No Drawing. Application June 2, 1934, Serial No. 728,704

26 Claims. (Cl. 18—50)

This invention resides in the discovery that the addition products of organic amino bodies and hydroxy aromatic compounds containing at least two discrete aromatic rings, new in and of themselves, are excellent antioxidants for rubber. These products are readily prepared by combining the amine and the hydroxy compound, preferably in equal molecular proportions or in multiples thereof, by any appropriate method, such as by dissolving them separately in an appropriate solvent, mixing the solutions and eliminating the solvent.

The addition products should not be confused with the condensation products made from the same raw materials with the elimination of water. The addition products, although they appear to be stable molecular compounds of definite composition, contain all the elements of the constituents, and resemble inorganic salts in that they are more or less readily dissociated into their constituents, in marked contradistinction to the condensation products, which possess fewer atoms than the raw materials and are comparatively inert and unreactive, not permitting a separation into the two original constituents. It is to be understood, however, that it is not intended to limit this invention by any theories which may be advanced herein by way of explanation or illustration, but that it is intended that the term "addition products" includes generally all products obtained by combining without the elimination of water amino bodies with hydroxy aromatic compounds containing at least two discrete aromatic rings.

A specific example of a material formed by the reaction of an amino body and a hydroxy aromatic compound containing at least two discrete aromatic rings, is the addition product of ortho hydroxy diphenyl and ethylene diamine believed to have the formula

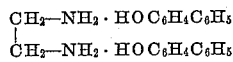

This material is readily prepared in yields of approximately 95% merely by intermixing a molar proportion of ethylene diamine with two molar proportions of ortho hydroxy diphenyl in alcoholic solution at room temperature and atmospheric pressure. Upon the addition of water to this solution an amber colored oil settles out. This oil, after being allowed to stand for a short period of time, solidifies into a yellowish solid which may be broken up with ease and which consists of a mass of granular crystals melting at 78–80° C.

Further illustrative of the invention, the addition product of ortho hydroxy diphenyl and hexamethylene tetramine is obtained by adding a molar proportion of hexamethylene tetramine, dissolved in water, to a molar proportion of ortho hydroxy diphenyl dissolved in alcohol. The material also is formed by the addition of formaldehyde to a solution of hydroxy diphenyl in ammoniacal alcohol. The product readily crystallizes from alcohol in a comparatively high state of purity, the crystals formed being clustered together as pure white needles. The crystals have a melting point of 161–162 degrees C., are soluble in dilute sodium hydroxide but insoluble in cold dilute hydrochloric acid. In the presence of the latter they are readily decomposed merely by the application of heat. In so decomposing, formaldehyde, ammonium chloride and ortho hydroxy diphenyl are liberated.

The addition product of para hydroxy diphenyl and beta naphthylamine is prepared by dissolving equimolar proportions of the two basic constituents in three or four parts of alcohol by the application of heat. Upon cooling this solution, the addition product is deposited in an approximately 67.5 percent yield in the form of glistening white plates having a sharp melting point of 130–131 degrees C.

Para hydroxy diphenyl likewise additively reacts with ethylene diamine in substantially the same manner as ortho hydroxy diphenyl, the reaction being preferably conducted in alcoholic solution at room temperature and atmospheric pressure. The addition product is obtained in the form of shining silvery white plates which are moderately soluble in alcohol and which melt at a temperature of 137–138 degrees C. Para hydroxy diphenyl also reacts with cyclohexyl amine merely by adding under similar conditions the amine to an alcohol solution of para hydroxy diphenyl. The addition product crystallizes from the solution in an approximately 68.5 percent yield as a glistening white crystalline powder melting at a temperature of 108–109 degrees C.

Para hydroxy diphenyl, like ortho hydroxy diphenyl, forms an addition product with hexamethylene tetramine upon the addition of hexamethylene tetramine in water solution to an alcoholic solution of para hydroxy diphenyl at normal temperatures and pressures. The addition product crystallizes from the solution in the form of clear glassy white rhombohedra or needles. The same product may also be obtained by the addition of formaldehyde to a solution of para hydroxy diphenyl in ammoniacal alcohol.

The melting point of the product in either case is approximately 152 degrees C.

Further illustrative of addition products of the invention is that of m-toluylene diamine and p-p'-di(hydroxy phenyl) 2-2-propane. This product is prepared by dissolving separately in 150 cc. portions of ethyl alcohol, 15 grams of m-toluylene diamine and 25 grams of p-p'-di(hydroxy phenyl) 2-2-propane. The solutions are combined and then diluted with approximately 700 cc. of water heated to a temperature of 60-65 degrees C. On cooling, the addition product separates out in the form of needle-like crystals melting at 67-68 degrees C.

71.5 grams of beta beta' dinaphthol are dissolved in 200 cc. of hot ethyl alcohol and 100 cc. of acetone. This solution is then mixed with 30.5 grams of m-toluylene diamine in 100 cc. of hot water. After cooling and standing for a period of approximately 48 hours, the addition product is obtained in the form of brown crystals melting at 150-155 degrees C.

Other amines which may be employed in the invention include any primary or secondary, aliphatic or aromatic amine. Exemplary are propylene diamine, ethyl amine, butyl amine, dimethyl amine, propyl amine, diethyl amine, dibutyl amine, benzylamine, dibenzyl amine, di iso amyl amine, di n-amylamine, di(phenyl ethyl) amine, morpholine, cyclohexyl phenyl amine, dicyclohexyl amine, alpha pipecoline, and piperidine. Others are aniline, o-toluidine, p-toluidine, alpha naphthylamine, beta aryl tetra hydro naphthylamine, alpha alicyclic tetra hydro naphthylamine, para phenylene diamine, m-toluylene diamine, benzidine, tolidine, p-phenetidine, alpha methyl beta naphthylamine, ethyl alpha naphthylamine, phenyl alpha naphthylamine, butyl naphthylamine, phenyl beta naphthylamine, dinaphthylamine, p-p' diamino diphenyl methane, 2-4-diamino diphenyl amine, diethanol amine, and anisidine. Others are phenyl para tolyl amine, diortho tolyl amine, dibutyl ethylene diamine, cyclohexyl alpha naphthylamine, dinaphthyl ethylene diamine, benzyl beta naphthylamine, carbazol and thio diphenyl amine. Still others are diphenylguanidine and reaction products of aldehydes and primary amines such as butyraldehyde alpha naphthylamine, aldol alpha naphthylamine and the like.

Any mono or poly hydroxy aromatic compound containing at least two discrete aromatic rings may be employed as the other constituent. Examples are the hydroxy biaryls such as p-p' dihydroxy diphenyl, o-o' dihydroxy diphenyl, alpha alpha' dihydroxy binaphthyl and dihydroxy bitolyl. Others are para hydroxy diphenyl amine, p-p' dihydroxy diphenyl amine, hydroxy binaphthyl, dihydroxy diphenyl methane, p-p' di hydroxy diphenyl dimethyl methane, p-p' di(hydroxy phenyl) 2-2-propane, and the like. For convenience, such compounds will hereinafter be termed "phenols containing at least two discrete aromatic rings".

As has already been intimated, the reaction products thus obtained are in a relatively high state of purity. The reactions are also exceedingly simple in character and may be conducted without use of any special apparatus or any particular precautions in the regulation of the conditions under which the reactions occur.

These materials may be advantageously employed as antioxidants for rubber. One rubber formula in which materials of this invention have been found particularly valuable is the following:

|  | Parts by weight |
|---|---|
| Extracted rubber | 100.0 |
| Zinc oxide | 5.0 |
| Sulphur | 3.0 |
| Hexamethylene tetramine | 1.0 |
| Stearic acid | 1.5 |
| Antioxidant | 1.0 |

One set of samples prepared in accordance with this formula was subjected to vulcanization for varying periods of time. Vulcanized samples were then subjected to physical tests in order to ascertain their tensile strength and elasticity prior to ageing. A second set vulcanized in precisely the same manner was first weighed and then placed in an oxygen bomb and exposed to the action of oxygen under a pressure of 150 pounds per square inch and at a temperature of 50 degrees C. for a period of six days. At the conclusion of this period of artificial ageing the samples were removed and weighed in order to ascertain the percent of oxygen absorbed, after which physical tests identical with those conducted upon the first set of samples were performed thereon. The results of these various tests are indicated as follows:

| Cure in mins. °F. | Original | | Stress kgs./cm.$^2$ | | Aged | | 500% | 700% | % wt. inc. |
|---|---|---|---|---|---|---|---|---|---|
|  | Tens. kgs./cm.$^2$ | Elong. in % | 500% | 700% | Tens. kgs./cm.$^2$ | Elong. in % |  |  |  |
| Addition product of o-hydroxy diphenyl and ethylene diamine | | | | | | | | | |
| 35/285° | 140 | 785 | 23 | 84 | 88 | 715 | 23 | 80 | 0.41 |
| 50 | 156 | 740 | 33 | 124 | 90 | 665 | 31 | -------- | 0.75 |
| 70 | 168 | 735 | 34 | 138 | 54 | 550 | 40 | -------- | 1.95 |
| Addition product of p-hydroxy diphenyl and beta naphthylamine | | | | | | | | | |
| 35/285° | 109 | 855 | 14 | 44 | 131 | 865 | 17 | 58 | 0.0 |
| 50 | 126 | 810 | 17 | 64 | 132 | 775 | 22 | 84 | 0.1 |
| 70 | 148 | 760 | 25 | 103 | 149 | 755 | 27 | 104 | 0.2 |
| Addition product of p-hydroxy diphenyl and ethylene diamine | | | | | | | | | |
| 35/285° | 142 | 775 | 24 | 92 | 135 | 745 | 27 | 104 | 0.1 |
| 50 | 152 | 730 | 31 | 126 | 151 | 710 | 36 | 143 | 0.3 |
| 70 | 175 | 715 | 39 | 161 | 119 | 650 | 42 | -------- | 0.8 |

| Cure in mins. °F. | Original | | Stress kgs./cm.² | | Aged | | 500% | 700% | % wt. inc. |
|---|---|---|---|---|---|---|---|---|---|
| | Tens. kgs./cm.² | Elong. in % | 500% | 700% | Tens. kgs./cm.² | Elong. in % | | | |
| Addition product of p-hydroxy diphenyl and m-toluylene diamine | | | | | | | | | |
| 35/285° | 128 | 780 | 22 | 82 | 104 | 725 | 24 | 90 | 0.16 |
| 50 | 148 | 760 | 27 | 106 | 114 | 715 | 28 | 105 | 0.43 |
| 70 | 160 | 720 | 35 | 139 | 97 | 645 | 36 | -------- | 0.92 |
| Addition product of p-hydroxy diphenyl and hexamethylene tetramine | | | | | | | | | |
| 35/285° | 78 | 810 | 13 | 43 | 41 | 760 | 11 | 30 | 0.42 |
| 50 | 105 | 775 | 19 | 68 | 35 | 695 | 13 | -------- | 0.83 |
| 70 | 129 | 760 | 26 | 92 | 27 | 555 | 19 | -------- | 1.21 |
| Addition product of p-hydroxy diphenyl and cyclohexyl amine | | | | | | | | | |
| 35/285° | 143 | 790 | 24 | 88 | 106 | 765 | 23 | 75 | 0.17 |
| 50 | 162 | 750 | 31 | 122 | 99 | 690 | 31 | -------- | 0.80 |
| 70 | 188 | 720 | 44 | 171 | 57 | 540 | 47 | -------- | 1.87 |
| Addition product of p-p' di(hydroxy phenyl) 2-2-propane and m-toluylene diamine | | | | | | | | | |
| 35/285° | 103 | 800 | 17 | 58 | 105 | 780 | 19 | 67 | 0.096 |
| 50 | 145 | 805 | 20 | 77 | 147 | 790 | 23 | 85 | 0.23 |
| 70 | 157 | 760 | 26 | 109 | 163 | 745 | 31 | 119 | 0.54 |
| Addition product of beta beta dinaphthol and m-toluylene diamine | | | | | | | | | |
| 35/285° | 71 | 730 | 18 | 59 | 102 | 775 | 22 | 75 | 0.12 |
| 50 | 105 | 750 | 21 | 81 | 149 | 790 | 24 | 90 | 0.15 |
| 70 | 157 | 765 | 27 | 104 | 155 | 750 | 30 | 116 | 0.17 |

From the foregoing it is apparent that the compounds herein disclosed are highly suitable for antioxidants of rubber. Not only do these compounds counteract the effects of such ageing influences but they tend to impart other highly desirable qualities, such for example as increased resistance to deterioration by flexing. It will be apparent that numerous changes may be made in the procedure to be followed and the chemicals employed without departing from the inventive concept.

It is to be understood that the term "rubber" is employed in the claims in a generic sense to include caoutchouc, whether or not admixed with fillers, pigments, vulcanizing or accelerating agents.

This application is a continuation in part of application Serial No. 503,233, filed December 18, 1930.

It is intended that the patent shall cover, by suitable expression in the appended claims, whatever features of patentable novelty reside in the invention.

What I claim is:

1. The method of preserving rubber which comprises vulcanizing a rubber composition comprising a vulcanizing agent, an active organic accelerator and the addition product of hydroxy diphenyl and beta naphthylamine.

2. The method of preserving rubber which comprises vulcanizing a rubber composition comprising a vulcanizing agent, an active organic accelerator and the addition product of hydroxy diphenyl and ethylene diamine.

3. The method of preserving rubber which comprises vulcanizing a rubber composition comprising a vulcanizing agent, an active organic accelerator and the addition product of hydroxy diphenyl and an aliphatic diamine.

4. The method of preserving rubber which comprises vulcanizing a rubber composition comprising a vulcanizing agent, an active organic accelerator and the addition product of hydroxy diphenyl and a primary aromatic amine.

5. The method of preserving rubber which comprises vulcanizing a rubber composition comprising a vulcanizing agent, an active organic accelerator and the addition product of hydroxy diphenyl and an aliphatic amine.

6. The method of preserving rubber which comprises vulcanizing a rubber composition comprising a vulcanizing agent, an active organic accelerator and the addition product of a hydroxy diphenyl and an aliphatic amine.

7. The method of preserving rubber which comprises vulcanizing a rubber composition comprising a vulcanizing agent, an active organic accelerator and the addition product of a hydroxy diphenyl and an aromatic amine of the benzene and naphthalene series.

8. The method of preserving rubber which comprises treating rubber with the addition product of a hydroxy biphenyl and an organic amine.

9. A composition of matter comprising rubber and the addition product of a hydroxy biaryl compound and an organic amine.

10. A composition of matter comprising rubber and the addition product of a hydroxy biphenyl and a hydrocarbon amine in which at least one hydrogen atom is directly attached to an amino nitrogen atom.

11. A rubber produce which has been vulcanized in the presence of the addition product of hydroxy diphenyl and a primary aromatic amine of the benzene and naphthalene series.

12. A rubber product which has been vulcanized in the presence of hydroxy diphenyl and beta naphthylamine.

13. The method of preserving rubber which comprises treating rubber with the addition product of a phenol containing at least two discrete rings and an amine.

14. The method of preserving rubber which comprises treating rubber with the addition product of a phenol containing at least two discrete aromatic rings and an aliphatic amine.

15. The method of preserving rubber which comprises treating rubber with the addition product of a phenol derived from an aromatic hydrocarbon containing two discrete aromatic rings and an aliphatic amine.

16. The method of preserving rubber which comprises treating rubber with the addition product of a phenyl phenol and an aliphatic amine.

17. The method of preserving rubber which comprises treating rubber with the addition product of a hydroxy substituted biaryl and an amine.

18. The method of preserving rubber which comprises treating rubber with the addition product of a phenyl phenol and an amine.

19. The method of preserving rubber which comprises treating rubber with the addition product of a phenol containing at least two discrete rings and an aromatic amine.

20. The method of preserving rubber which comprises treating rubber with the addition product of a phenol derived from an aromatic hydrocarbon containing two discrete aromatic rings and an aromatic amine.

21. The method of preserving rubber which comprises treating rubber with the addition product of a phenol containing at least two discrete aromatic rings and an aromatic primary amine.

22. The method of preserving rubber which comprises treating rubber with the addition product of a phenol containing at least two discrete aromatic rings and an aromatic diamine.

23. The method of preserving rubber which comprises treating rubber with the addition product of a hydroxy substituted biaryl and an aromatic primary diamine.

24. A composition comprising rubber and the addition product of a phenol containing at least two discrete rings and an amine.

25. A composition comprising rubber and the addition product of a phenol derived from an aromatic hydrocarbon containing two discrete aromatic rings and an aliphatic amine.

26. A composition comprising rubber and the addition product of a phenol containing at least two discrete aromatic rings and an aromatic primary amine.

WILLIAM D. WOLFE.